United States Patent
Yoshida

(10) Patent No.: US 10,708,452 B2
(45) Date of Patent: Jul. 7, 2020

(54) IMAGE FORMING APPARATUS THAT SELECTIVELY DISPLAYS EXECUTED JOBS, METHOD OF CONTROLLING SAME, AND STORAGE MEDIUM

(71) Applicant: CANON KABUSHIKI KAISHA, Tokyo (JP)

(72) Inventor: Hiroyoshi Yoshida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/260,645

(22) Filed: Jan. 29, 2019

(65) Prior Publication Data
US 2019/0245989 A1   Aug. 8, 2019

(30) Foreign Application Priority Data
Feb. 5, 2018   (JP) .................................. 2018-018374

(51) Int. Cl.
*G06F 3/12* (2006.01)
*H04N 1/00* (2006.01)

(52) U.S. Cl.
CPC ....... *H04N 1/00411* (2013.01); *G06F 3/1204* (2013.01); *G06F 3/1205* (2013.01); *H04N 1/00389* (2013.01); *H04N 1/00474* (2013.01); *H04N 1/00482* (2013.01); *H04N 1/00517* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,936,088 B2 | 4/2018 | Yoshida | |
| 2013/0050731 A1* | 2/2013 | Fukuoh | G06F 3/1258 358/1.13 |
| 2014/0055799 A1* | 2/2014 | Nakagawa | G06K 15/1803 358/1.13 |
| 2015/0222770 A1* | 8/2015 | Yoshida | H04N 1/00517 358/1.15 |

FOREIGN PATENT DOCUMENTS

JP   2015146503 A   8/2015

* cited by examiner

*Primary Examiner* — Henok Shiferaw
(74) *Attorney, Agent, or Firm* — Rossi, Kimms & McDowell LLP

(57) ABSTRACT

An image forming apparatus improved in convenience of reusing executed jobs. A selection screen for selecting between jobs for image processing, and a configuration screen for selecting setting values for a selected job are displayed on a display. A combination of setting values of setting items for an executed job are accumulated in an HDD in association with a job selected on the selection screen when executing the job. A custom job displayed on the selection screen is registered together with setting values configured by a user. The accumulated executed jobs are selectively displayed on the selection screen, together with application jobs associated with the image processing functions, and registered custom jobs configured by the user. The executed jobs are displayed on the selection screen such that jobs executed by selecting the application job and jobs executed by selecting the custom job are discernible.

10 Claims, 20 Drawing Sheets

FIG. 6

| TYPE | NUMBER OF COPIES | COLOR | SHEET | AGGREGATION | DOUBLE-SIDED PRINT | SPREAD →2 PAGES | MAGNIFICATION | etc... |
|---|---|---|---|---|---|---|---|---|
| | | | | SETTING VALUES | | | | |
| DEFAULT | 1 | MONOCHROME | AUTOMATIC | 1 in 1 | SINGLE-SIDED | OFF | 100% | ... |
| CURRENT | 2 | COLOR | AUTOMATIC | 1 in 1 | DOUBLE-SIDED | OFF | 100% | ... |

101 — DEFAULT
102 — CURRENT

FIG. 8

| BUTTON ID | APP.ID | FILE NAME | DISPLAY TEXT | | |
|---|---|---|---|---|---|
| | | | DATE & TIME | SETTING VALUES | NAME |
| 1001 | 101 | data1.xml | 2016/12/18 12:54:30 | | CONTRACT |
| 1002 | 101 | data2.xml | 2016/12/16 15:38:16 | 5 COPIES, COLOR, DOUBLE-SIDED | |
| 1003 | 201 | data1.xml | 2016/12/17 08:25:43 | | TRANSMISSION TO MYSELF |
| | | | | | |
| | | | | | |
| | | | | | |
| | | | | | |

FIG. 13

| BUTTON ID | APP.ID | FILE NAME | DISPLAY TEXT ||||
|---|---|---|---|---|---|---|
| | | | DATE & TIME | SETTING VALUES | NAME ||
| 1001 | 101 | data1.xml | 2016/12/18 12:54:30 | 2 COPIES, COLOR, DOUBLE-SIDED | CONTRACT ||
| 1002 | 101 | data2.xml | 2016/12/16 15:38:16 | 5 COPIES, COLOR, DOUBLE-SIDED | ||
| 1003 | 201 | data1.xml | 2016/12/17 08:25:43 | A4, AUTOMATIC (COLOR/GRAY) | TRANSMISSION TO MYSELF ||

FIG. 16

| | | | DISPLAY TEXT | | |
|---|---|---|---|---|---|
| BUTTON ID | APP.ID | FILE NAME | DATE & TIME | SETTING VALUES | NAME |
| 1001 | 101 | data1.xml | 2016/12/18 12:54:30 | COLOR | CONTRACT |
| 1002 | 101 | data2.xml | 2016/12/16 15:38:16 | 5 COPIES, COLOR, DOUBLE-SIDED | |
| 1003 | 201 | data1.xml | 2016/12/17 08:25:43 | AUTOMATIC (COLOR/GRAY) | TRANSMISSION TO MYSELF |
| | | | | | |
| | | | | | |
| | | | | | |
| | | | | | |

| CUSTOM ID | NAME | COMMENT | APPLICATION ID | SETTING FILE NAME |
|---|---|---|---|---|
| 0504 | CONTRACT | 2 COPIES, COLOR, DOUBLE-SIDED | 101 | cstm01.xml |
| 0505 | REQUEST | | 101 | cstm02.xml |
| 0506 | TRANSMISSION TO MYSELF | 300dpi, IMAGE | 201 | cstm01.xml |

| CUSTOM ID | NAME | COMMENT | APPLICATION ID | SETTING FILE NAME |
|---|---|---|---|---|
| 0504 | CONTRACT FOR STORAGE | 3 COPIES, COLOR, DOUBLE-SIDED | 101 | cstm03.xml |
| 0505 | REQUEST | | 101 | cstm02.xml |
| 0506 | TRANSMISSION TO MYSELF | 300dpi, IMAGE | 201 | cstm01.xml |

FIG. 20

| BUTTON ID | APP.ID | FILE NAME | DISPLAY TEXT ||||  CUSTOM ID |
|---|---|---|---|---|---|---|
| | | | DATE & TIME | SETTING VALUES | NAME | |
| 1001 | 101 | data1.xml | 2016/12/18 12:54:30 | | CONTRACT FOR STORAGE | 0504 |
| 1002 | 101 | data2.xml | 2016/12/16 15:38:16 | 5 COPIES, COLOR, DOUBLE-SIDED | | |
| 1003 | 201 | data1.xml | 2016/12/17 08:25:43 | | TRANSMISSION TO MYSELF | 0506 |

IMAGE FORMING APPARATUS THAT SELECTIVELY DISPLAYS EXECUTED JOBS, METHOD OF CONTROLLING SAME, AND STORAGE MEDIUM

BACKGROUND OF THE INVENTION

Field of the Invention

The present invention relates to an image forming apparatus that selectively displays executed jobs.

Description of the Related Art

An image forming apparatus disclosed in Japanese Laid-Open Patent Publication (Kokai) No. 2015-146503 selectively displays jobs having been executed by the image forming apparatus. Further, in Japanese Laid-Open Patent Publication (Kokai) No. 2015-146503, executed settings of a job are displayed on a button of the executed job. By selecting an executed job, a user can cause the image forming apparatus to execute a job with the same settings as those of the executed job without performing the same configuration operations for the executed job.

Incidentally, some image forming apparatuses allow a user to register a custom job. The custom job can be executed by selecting an associated one of custom buttons 53 displayed on a selection screen for selecting between application jobs associated with image processing functions provided by the apparatus. However, even when the image forming apparatus of this type displays values of the executed settings on the button of an executed job as disclosed in Japanese Laid-Open Patent Publication (Kokai) No. 2015-146503, the user sometimes cannot easily remember the executed job. More specifically, when the user causes the image forming apparatus to execute a custom job, the user performs an operation for selecting the custom button 53 on the selection screen, and performs an operation for selecting setting values different from the initial setting values, on a configuration screen on which f the custom job is initialized. On the other hand, on a button of an executed job based on this execution of the custom job, values of executed settings are displayed similar to the other executed jobs. As a result, there is a high possibility that even when the user visually recognizes the setting values displayed on the button of the executed job, the user cannot intuitively remember that this button is a button of the executed job executed by selection of the custom job. In this case, the user is required to sequentially operate the buttons of the executed jobs, which are displayed on the selection screen, one by one, and checks the settings of each executed job on the configuration screen.

As described above, the image forming apparatus is required to improve the convenience of reusing an executed job.

SUMMARY OF THE INVENTION

The present invention provides an image forming apparatus that is improved in convenience of reusing an executed job, a method of controlling the same, and a storage medium.

In a first aspect of the present invention, there is provided an image forming apparatus comprising a display unit configured to display a selection screen for selecting between jobs for image processing, and a configuration screen for selecting setting values with respect to a selected job, a recording unit configured to accumulate and record a combination of setting values of a plurality of setting items for an executed job, in association with a job selected on the selection screen when executing the job, a registration unit configured to register a custom job to be displayed on the selection screen in the recording unit together with setting values configured by a user, and a display control unit configured to control display on the display unit, wherein the display control unit selectively displays, on the selection screen, the executed jobs accumulated in the recording unit, together with an application job associated with an image processing function provided by the apparatus, and the custom job configured by the user and registered by the registration unit, and displays the executed jobs on the selection screen such that each job executed by selecting the application job and each job executed by selecting the custom job are discernible from each other.

In a second aspect of the present invention, there is provided a method of controlling an image forming apparatus that displays a selection screen for selecting between jobs for image processing, and a configuration screen for selecting setting values with respect to a selected job, on a display unit, comprising accumulating and recording a combination of setting values of a plurality of setting items for an executed job, in a recording unit, in association with a job selected on the selection screen when executing the job, registering a custom job to be displayed on the selection screen in the recording unit together with setting values configured by a user, and displaying the selection screen on the display unit, wherein said displaying includes selectively displaying, on the selection screen, the executed jobs accumulated in the recording unit, together with an application job associated with an image processing function provided by the apparatus, and the custom job configured by the user and registered by said registering, and displaying the executed jobs on the selection screen such that each job executed by selecting the application job and each job executed by selecting the custom job are discernible from each other.

In a third aspect of the present invention, there is provided a non-transitory computer-readable storage medium storing a computer-executable program for executing a method of controlling an image forming apparatus that displays a selection screen for selecting between jobs for image processing, and a configuration screen for selecting setting values with respect to a selected job, on a display unit, wherein the method comprises accumulating and recording a combination of setting values of a plurality of setting items for an executed job, in a recording unit, in association with a job selected on the selection screen when executing the job, registering a custom job to be displayed on the selection screen in the recording unit together with setting values configured by a user, and displaying the selection screen on the display unit, wherein said displaying includes selectively displaying, on the selection screen, the executed jobs accumulated in the recording unit, together with an application job associated with an image processing function provided by the apparatus, and the custom job configured by the user and registered by said registering, and displaying the executed jobs on the selection screen such that each job executed by selecting the application job and each job executed by selecting the custom job are discernible from each other.

According to the present invention, it is possible to improve convenience of reusing an executed job in the image forming apparatus.

Further features of the present invention will become apparent from the following description of exemplary embodiments (with reference to the attached drawings).

BRIEF DESCRIPTION OF THE DRAWINGS

FIG. 6 is a diagram showing an example of a data table stored in a memory area of an HDD for the copy function.

FIG. 8 is a diagram showing an example of integrated history data in which each executed jobs is registered as history data by the process shown in FIG. 7.

FIG. 13 is a diagram showing an example of the integrated history data, in which each executed job is registered as history data by the process shown in FIG. 12.

FIG. 16 is a diagram showing an example of the integrated history data, in which each executed job is registered as history data by the process shown in FIG. 15.

FIGS. 18A and 18B are explanatory diagrams each showing an example of configuration data for a custom job which can be set by a user in the third embodiment of the present invention.

FIG. 20 is a diagram showing an example of the integrated history data updated by the process shown in FIG. 19.

DESCRIPTION OF THE EMBODIMENTS

The present invention will now be described in detail below with reference to the accompanying drawings showing embodiments thereof. Note that the following description of configuration of the embodiments is given only by way of example, and the scope of the present invention is not limited to the configuration described for the embodiments.

Figure 1:
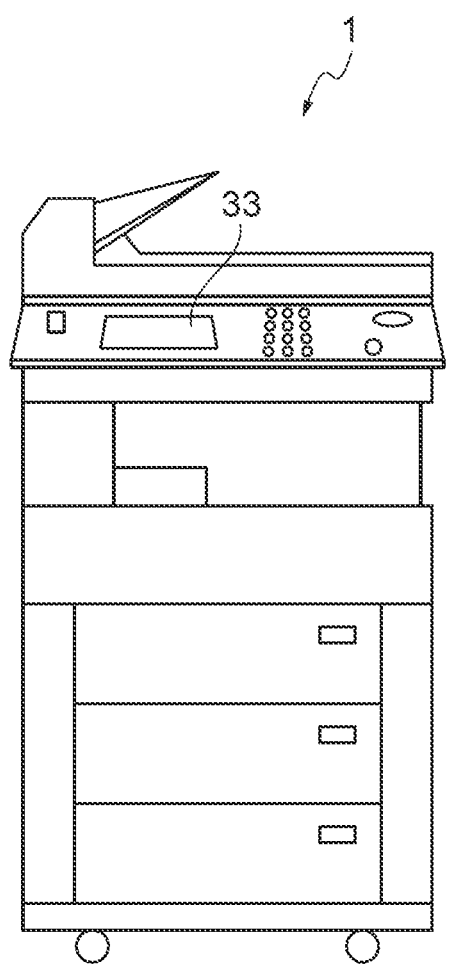
FIG. 1 is a view of the appearance of an image forming apparatus according to a first embodiment of the present invention.

FIG. 1 is a view of the appearance of an image forming apparatus 1 according to a first embodiment of the present invention. The image forming apparatus 1 shown in FIG. 1 is a multi-function peripheral having a plurality of functions, such as a print function, a scanner function, a copy function, and a fax function.

Figure 2:
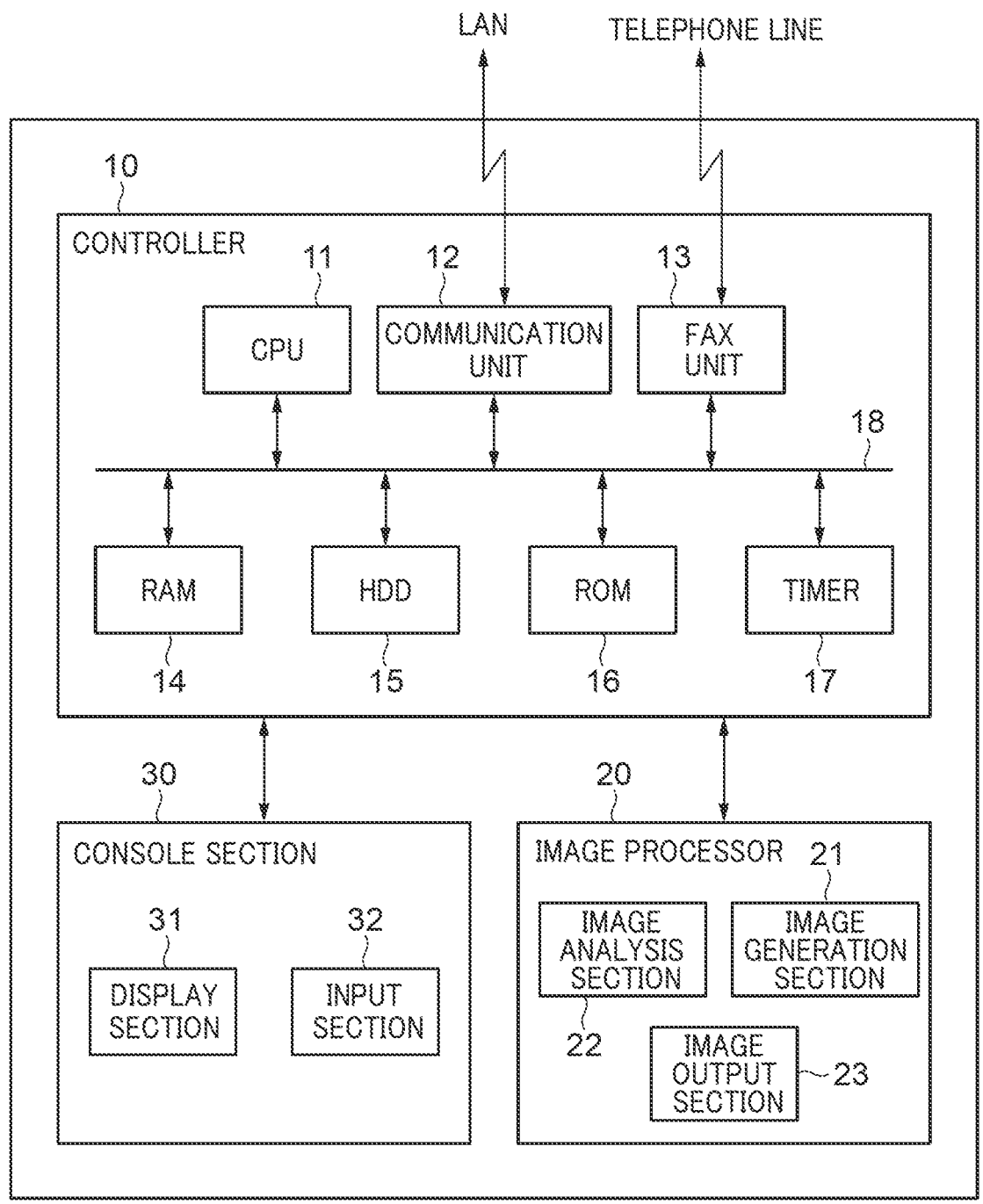
FIG. 2 is a block diagram useful in explaining the configuration of the image forming apparatus shown in FIG. 1.

FIG. 2 is a block diagram useful in explaining the configuration of the image forming apparatus 1 shown in FIG. 1. A controller 10, an image processor 20, and a console section 30 are shown in FIG. 2. The controller 10 controls the operations of the image forming apparatus 1. The controller 10 includes a CPU 11, a communication unit 12, a fax unit 13, a RAM 14, an HDD 15, a ROM 16, a timer 17, and a system bus 18 that connects these components such that they are capable of performing bi-directional data communication. A LAN cable, not shown, is connected to the communication unit 12. Other apparatuses, such as a computer apparatus and another image forming apparatus 1, are connected to the LAN cable. The communication unit 12 controls transmission and reception of data to and from the other apparatuses via the LAN cable. In a case where the LAN cable is connected to a router, the communication unit 12 can transmit and receive data to and from the other apparatuses via the router and the Internet. Note that the communication unit 12 may be configured to perform data communication with the router by wireless communication. A telephone line, not shown, is connected to the fax unit 13. The fax unit 13 controls transmission and reception of fax data to and from another image forming apparatus 1 via the telephone line. The HDD 15 is a hard disk drive, and may be replaced by a recording medium, such as a magnetic disk, an optical medium, and a flash memory. The HDD 15 records image data and document data which are generated within the image forming apparatus 1 and are received from the other apparatuses. Further, the HDD 15 functions as a recording unit, and records various configuration data used in the image forming apparatus 1. The HDD 15 is not necessarily required to be included within the image forming apparatus 1, and in this case, for example, a recording medium included in an external server or computer apparatus that is capable of transmitting and receiving data via the communication unit 12 may be used as a storage device. The RAM 14 provides a system work memory for the operation of the CPU 11. The ROM 16 is a boot ROM, and stores a boot program for the system. The CPU 11 controls the overall operation of the image forming apparatus 1 and the controller 10. The CPU 11 loads programs installed in the HDD 15 into the RAM 14 using the boot ROM of the ROM 16, and executes various controls based on the programs. In the HDD 15, integrated history data in which executed jobs are registered as history data is recorded as described hereinafter. When executing a job, in association with the job selected for execution on a selection screen 50, described hereinafter with reference to FIG. 3B, for jobs, a combination of setting values of a plurality of setting items of the executed job is accumulated and recorded, as each item of the integrated history data. The timer 17 measures a time and a time period. The timer 17 measures the time period in response to an instruction from the CPU 11, and notifies the CPU 11 of a result of the measurement when the instructed time period elapses, by interrupt.

The image processor 20 includes an image generation section 21, an image analysis section 22, and an image output section 23. The image generation section 21 reads an original placed e.g. on a scanner by scan processing, and generates image data by digitalizing an image of the original. The image generation section 21 stores the generated image data in the HDD 15. The image analysis section 22 analyzes a structure of the original image using the image data, and extracts necessary information from a result of the analysis. The image generation section 21 may convert e.g. a format of the image data subjected to scan processing to another, using the analysis information output from the image analysis section 22. The image output section 23 acquires image data from the HDD 15, and outputs the image data. Image data is output, for example, by printing on a sheet, transmitting from the communication unit 12 to an external device or a server connected via a network, or storing in a recording medium removably connected to the image forming apparatus 1.

The console section 30 includes a display section 31 as a display unit, and an input section 32. The console section 30 functions as a user interface, under the control of the CPU 11 as a display control unit. Note that the console section 30 may be provided such that it is removable from the image forming apparatus 1, and may transmit and receive data to and from the controller 10 via wireless communication. Further, a PDA or another user device, formed separately from the image forming apparatus 1, may be used as the console section 30. The display section 31 is a device which displays information of the image forming apparatus 1 to a user. The display section 31 displays a screen instructed by the controller 10. Examples of the screen to be displayed include the selection screen 50 for selecting between jobs associated with the image processing functions provided by the image forming apparatus 1, and a configuration screen 60, described hereinafter with reference to FIG. 5, for selecting various setting values for a selected job. The input section 32 is implemented e.g. by a touch panel device 33 which is provided with the function of the display section 31, a pointing device, a camera device, an audio input device, and a keyboard device. The input section 32 generates information to be input to the image forming apparatus 1 based on a user's operation, and transmits the generated information to the controller 10.

Figure 3A:
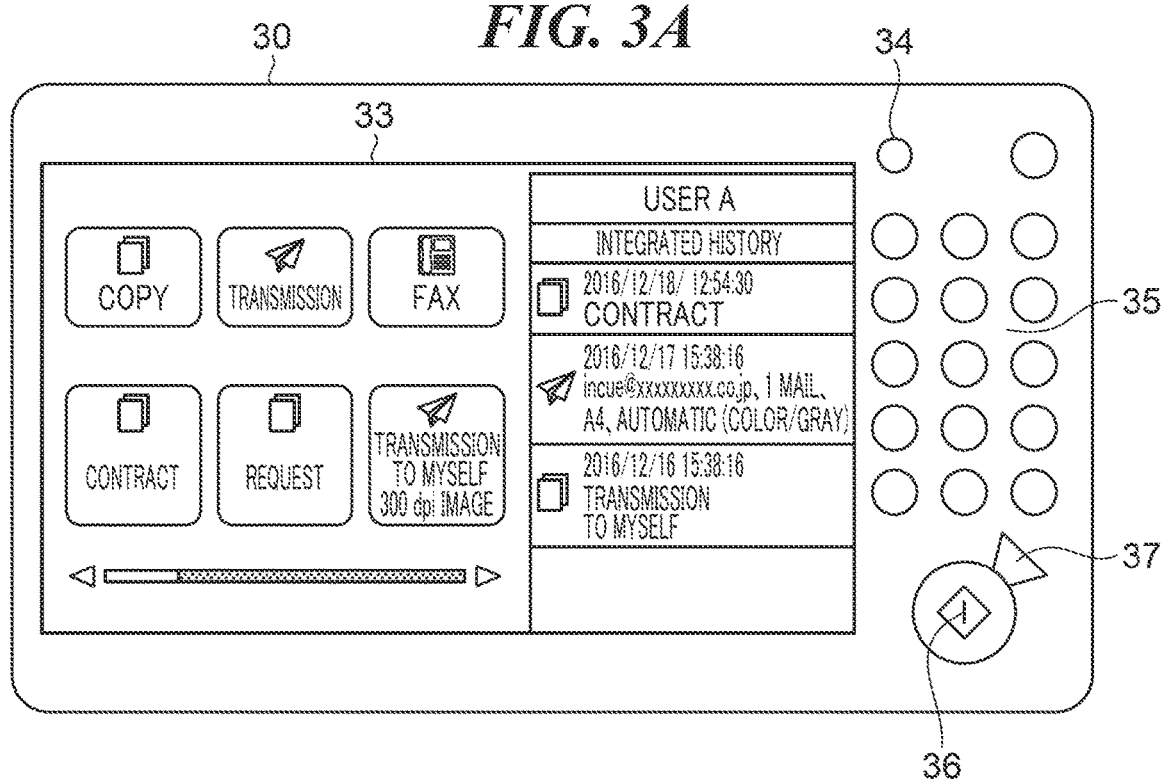
FIGS. 3A and 3B are views showing an example of a console section appearing in FIG. 2 and an example of a selection screen for jobs, respectively.
Figure 3B:
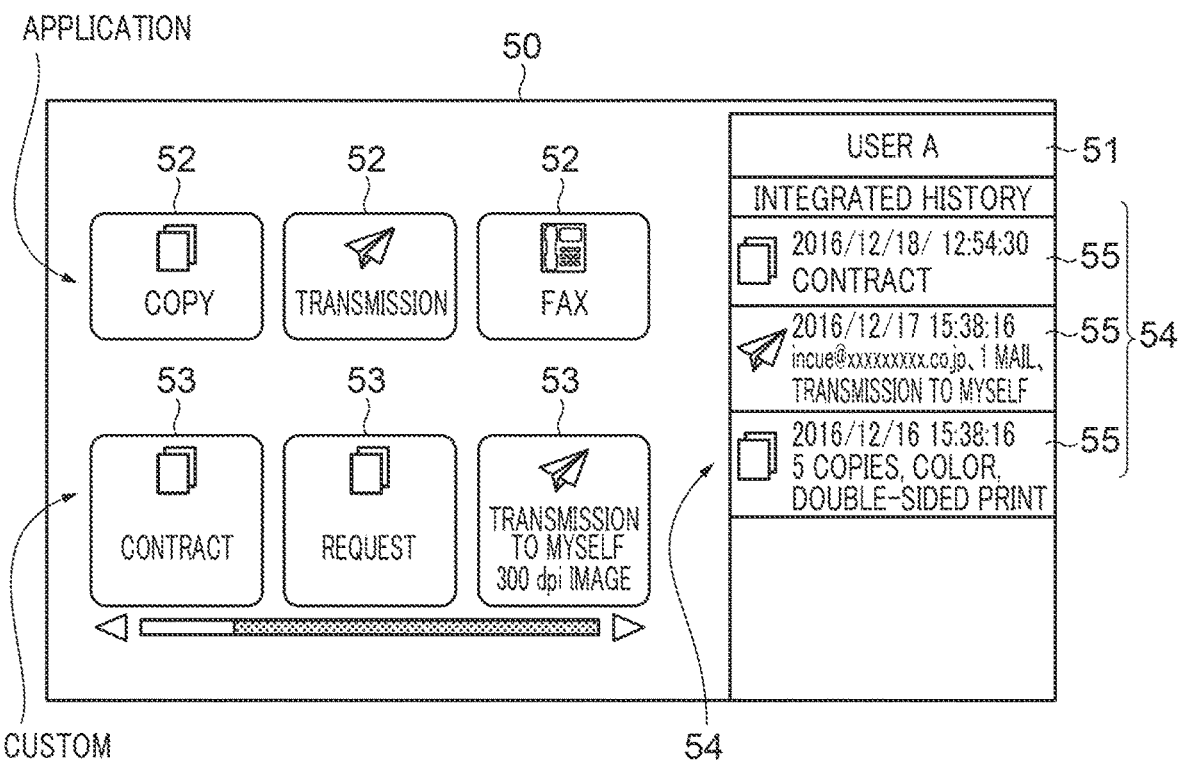

FIGS. 3A and 3B show an example of the console section appearing in FIG. 2 and an example of the job selection screen, respectively. As shown in FIG. 3A, the console section 30 includes the touch panel device 33 and a key device. The touch panel device 33 is formed by affixing a touch panel sheet on a screen of a liquid crystal display device. When a user performs an operation on the touch panel device 33, the input section 32 transmits data corresponding to the operation to the controller 10. The key device includes a user mode key 34, numeric keys 35, a start key 36, and a stop key 37. The user mode key 34 is pressed in a case where the user configures settings of the apparatus. The numeric keys 35 are formed by buttons of numbers and characters, and are pressed e.g. in a case where the user sets the number of copies, and switches the screen of the touch panel device 33. The start key 36 is pressed to start e.g. a copy job for reading an original and outputting image data. The stop key 37 is pressed to stop a job being operated. When the user presses a key of the key device, the input section 32 transmits operation data corresponding to the pressed key to the controller 10. The console section 30 controls the display on the display section 31, and detects an operation dependent on the display using the input section 32.

Further, as shown in FIG. 3B, the touch panel device 33 displays the selection screen 50 on which the settings made by a logged-in user are reflected. The CPU 11 causes the selection screen 50 shown in FIG. 3B to be displayed when the user has been authenticated. The name of the currently logged-in user is displayed in a user name display area 51 at an upper right portion of the screen. On the selection screen 50, there are displayed application buttons 52 for starting applications associated with image processing functions provided by the image forming apparatus 1 and custom buttons 53 for starting applications with the setting values registered by user configuration in advance, in list form, in respective separate areas. The custom buttons 53 may be commonly displayed for other users different from the logged-in user. Further, the display layout of these buttons can be changed e.g. by user configuration. Further, by performing an operation for flicking the selection screen 50 displaying these buttons, the next set of application buttons 52 and custom buttons 53 can be displayed on the selection screen 50. Further, an integrated history area 54 is displayed separately from the areas for displaying the other buttons. The integrated history area 54 displays a list of executed jobs, each of which was executed by the image forming apparatus 1 and was automatically stored in association with a combination of setting values used for the job, in the form of a history button 55 which can be selected. In a case where the user has been authenticated and logged in, only jobs which was executed by the authenticated user in the past may be displayed in the integrated history area 54. In the illustrated example, three history buttons 55 are displayed. Jobs and configuration information in the past are stored in the RAM 14 and the HDD 15 as history data 81 (described with reference to FIG. 8) recorded when executing each of them. Each history button 55 is generated by processing performed by the CPU 11 based on the history data 81.

Figure 4:
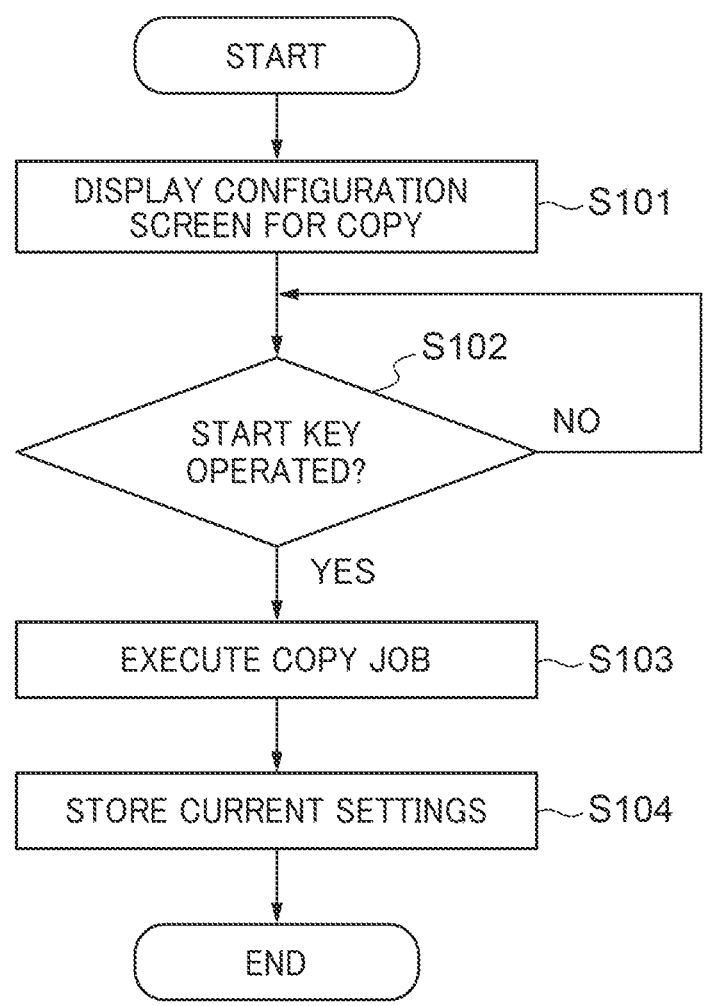
FIG. 4 is a flowchart of a job execution process performed in a case where a button associated with a copy function is selected on the selection screen shown in FIG. 3B.

Next, a description will be given of a process (job execution process) performed by the image forming apparatus 1, for executing a job associated with each of the various functions according to a user's operation. In the present example, a process associated with the copy function is described by way of example. FIG. 4 is a flowchart of the job execution process performed by the CPU 11 of the image forming apparatus 1 in a case where the application button 52 or the custom button 53, associated with the copy function, is selected on the selection screen 50 shown in FIG. 3B. The CPU 11 performs a similar process as that in FIG. 4 for each of the other functions. In a step S101, the CPU 11 reads data of the configuration screen 60 of the copy function and a combination of initial values of a plurality of setting items for the copy function from the HDD 15, and displays the configuration screen 60 of the copy function for which the initial values are assigned, on the touch panel device 33.

Figure 5:
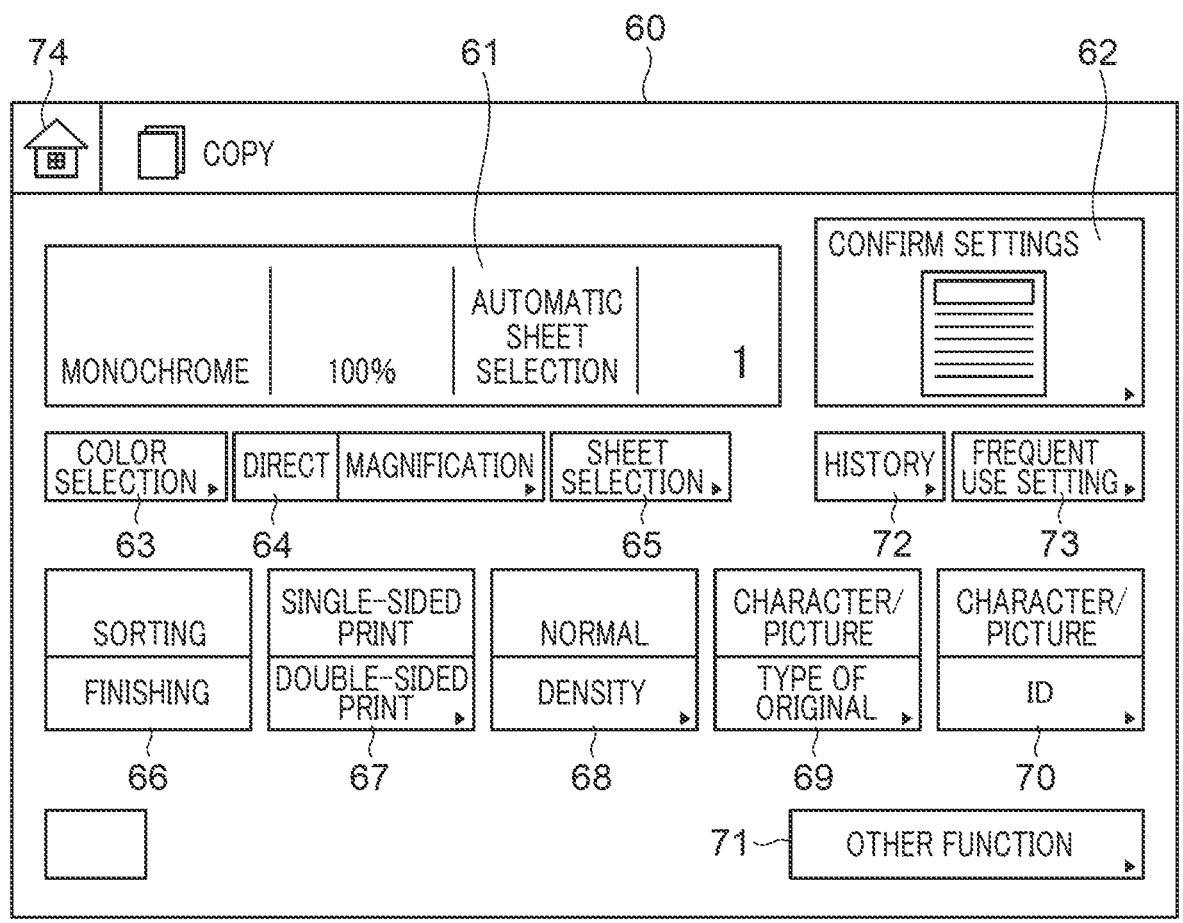
FIG. 5 is a view showing an example of a configuration screen of the copy function, displayed on a touch panel device appearing in FIG. 3A.

FIG. 5 is a view showing an example of the configuration screen 60 of the copy function, which is displayed on the touch panel device 33 appearing in FIG. 3A. On the configuration screen 60 of the copy function, shown in FIG. 5, there are displayed an area 61 for displaying the initial values of a color, a magnification, a sheet size, and the number of copies, and a preview screen 62 of a copied image on which the current configuration is reflected. When the preview screen 62 is operated, the CPU 11 displays the details of the current setting values on the touch panel device 33. Further, on the configuration screen 60 shown in FIG. 5, there are displayed a color selection button 63, a magnification setting button 64, a sheet selection button 65, a finish button 66, a double-sided print button 67, a density button 68, a document type button 69, an ID card copy button 70, and an other function button 71. These buttons are used for setting a setting value for each setting item, and are highlighted depending on the current setting value. When the user operates a button, the CPU 11 highlights the operated button, and cause a setting value associated with the operated button to be reflected on the setting values of the current job. On the configuration screen 60 shown in FIG. 5, monochrome is set as the color, a value of 100% is set as the magnification, automatic sheet selection is set as the sheet size, a value of 1 is set as the number of copies, and sorting is set as finishing. A configuration history button 72 is a button for displaying the setting values set in the past concerning the copy function. A frequent use setting button 73 is a button for displaying the setting values registered by the user in advance. A home button 74 is a button for returning the screen to the selection screen 50.

In a step S102, the CPU 11 determines whether or not the start key 36 is operated. The CPU 11 waits for the start key 36 to be operated. If the start key 36 is operated, in a step S103, the CPU 11 executes a copy job based on the current setting values. The CPU 11 causes the image generation section 21 of the image processor 20 to read an original, and convert the read image data according to the setting values, and causes the image output section 23 to output the converted image data. With this, the original is copied to sheets in a state compiled for each number of copies. In a step S104, the CPU 11 stores the combination of the current setting values in the HDD 15 as the history data 81 of copy processing.

FIG. 6 is a diagram showing an example of a data table stored in a memory area for the copy function in the HDD 15. In a first row of a data area of the data table shown in FIG. 6, default configuration data 101 as the initial settings is stored. The default configuration data 101 is used as the initial setting values when the application button 52 is selected. In a second row of the data area of the data table shown in FIG. 6, the current configuration data 102 is stored. Each data item has a combination of respective setting values of the plurality of setting items, including the number of copies, color selection, sheet selection, page aggregation, double-sided print, spread-page division, and magnification.

Figure 7:
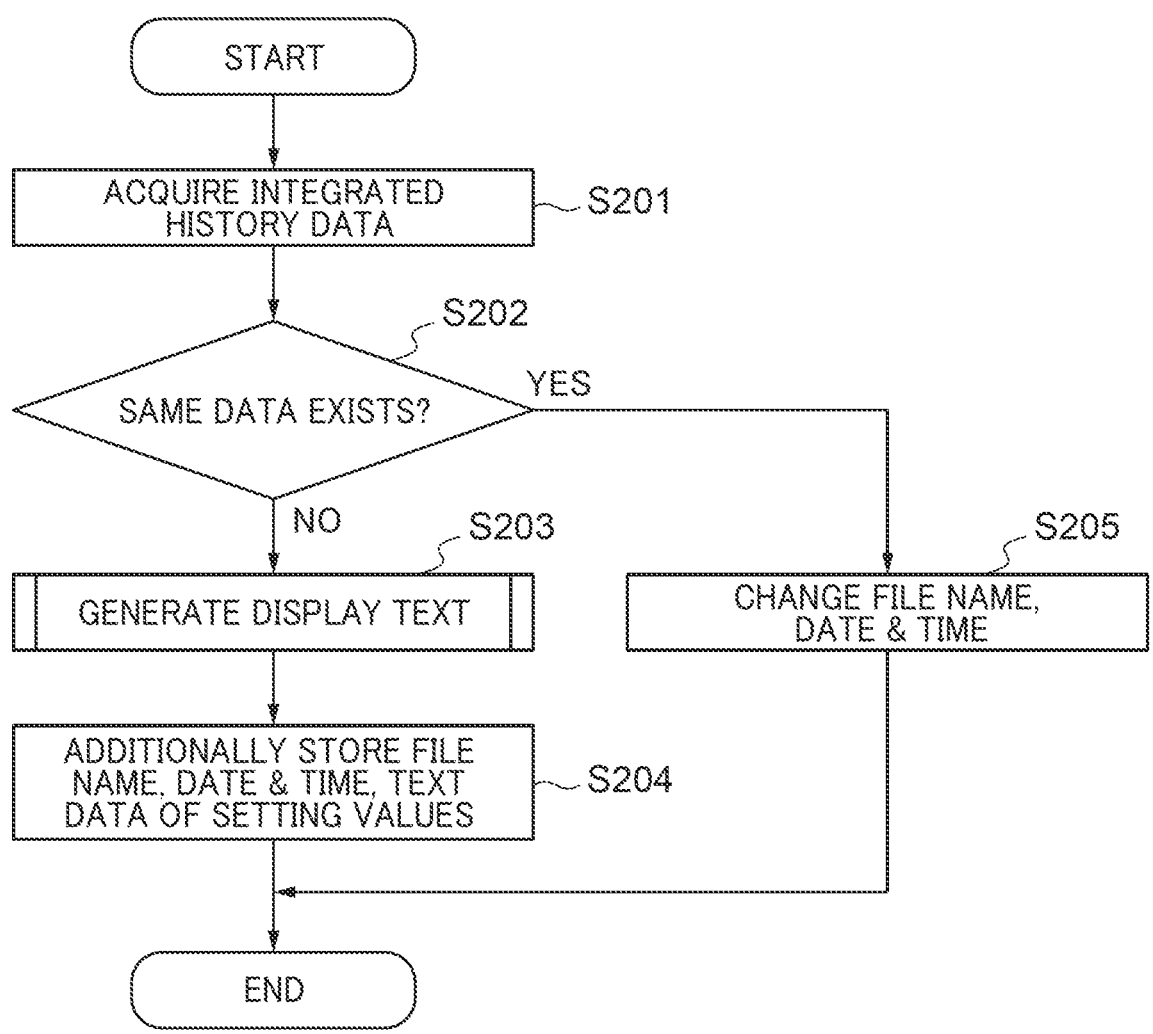
FIG. 7 is a flowchart of a process performed for an executed job by a CPU as a registration unit, after the job is executed according to the process shown in FIG. 4.

Next, pre-processing for displaying the integrated history area 54 on the selection screen 50 shown in FIG. 3B will be described. FIG. 7 is a flowchart of a process performed for an executed job by the CPU 11 as a registration unit, after the job is executed according to the process shown in FIG. 4. In a step S201, the CPU 11 acquires the integrated history data, denoted by reference numeral 80, stored in the HDD 15.

FIG. 8 is a diagram showing an example of the integrated history data 80 in which each executed job is registered as the history data 81 by the process shown in FIG. 7. The integrated history data 80 is stored in the HDD 15. Each row in a data area of the integrated history data 80 shown in FIG. 8 indicates the history data 81. The history data 81 is data indicative of a combination of setting values of the plurality of setting items, which were set when a user used the image forming apparatus 1. The history data 81 is composed of data items indicating setting values for respective setting items of a button ID 82, an application ID 83, a file name 84 of a file storing the setting values of the plurality of setting items of a job executed by an application, and display text 85. A plurality of items of the history data 81 are recorded in the form of a data table. The button ID 82 is an identification number of each history. The application ID 83 is an ID for identifying which of the functions of the image forming apparatus 1 is used to execute the associated job. The application ID 83 is predetermined for each function: "101" for the copy function and "201" for the transmission function, for example. A file stores a combination of setting values of the plurality of setting items of a job executed by an application, which were set for the application when the user used the image forming apparatus 1. For example, in a case where the copy function was used, the file stores all of the setting values of the plurality of setting items, which were required to be set for the copy function, such as the number of copies, a color, and a sheet size. Each file is generated whenever a job is executed and a different file name 84 is assigned to the file. In a case where a button associated with the copy function is operated on the selection screen 50, all of the setting values of the plurality of setting items, which are required to be set for the copy function, are read from the file, and are set as the initial values on the configuration screen 60. The display text 85 includes data of date and time at which a job has been executed, and text data corresponding to characteristic setting values of the job. The display text 85 can be used as text displayed on the history button 55. By displaying a combination of the data of date and time at which the job was executed and the characteristic setting values of the job as mentioned above, the user can easily remember the settings with which the job associated with the displayed button was executed in the past. In the integrated history data 80 shown in FIG. 8, the three items of the history data 81 are recorded. In this case, the CPU 11 acquires all items of the history data 81 having the application ID 83 associated with the job (copy job), of which the data table is shown in FIG. 6, from the HDD 15.

In a step S202, the CPU 11 compares all items of the acquired history data 81 and the current configuration data, denoted by 102 in the data table shown in FIG. 6, for the job executed this time, and determines whether or not the same data as the current configuration data already exists in the items of the history data 81. If the same data exists as the history data 81, in a step S205, the CPU 11 changes the file name 84 and the date and time of the display text 85 of the same history data 81 to those of the current data. With this, it is possible to prevent a plurality of items of the history data 81 which have a redundant or same combination of the plurality of setting values from being registered in the integrated history data 80, thereby making it possible to prevent a plurality of history buttons 55 associated with the same setting values from being displayed on the selection screen 50. Further, by updating the information indicative of the date and time to the latest date and time, it is possible to help the user remember the settings. If the same data as the current configuration data does not exist in the items of the history data 81, the CPU 11 proceeds to a step S203 to generate display text including the date and time, characteristic setting values, and a name of the current executed job. Further, in a step S204, the CPU 11 additionally stores the file name 84 of a file storing the current setting values, and display text 85 including the date and time and the characteristic setting values of the job, together with the button ID 82 and application ID 83, as new a new item of the history data 81.

Figure 9:
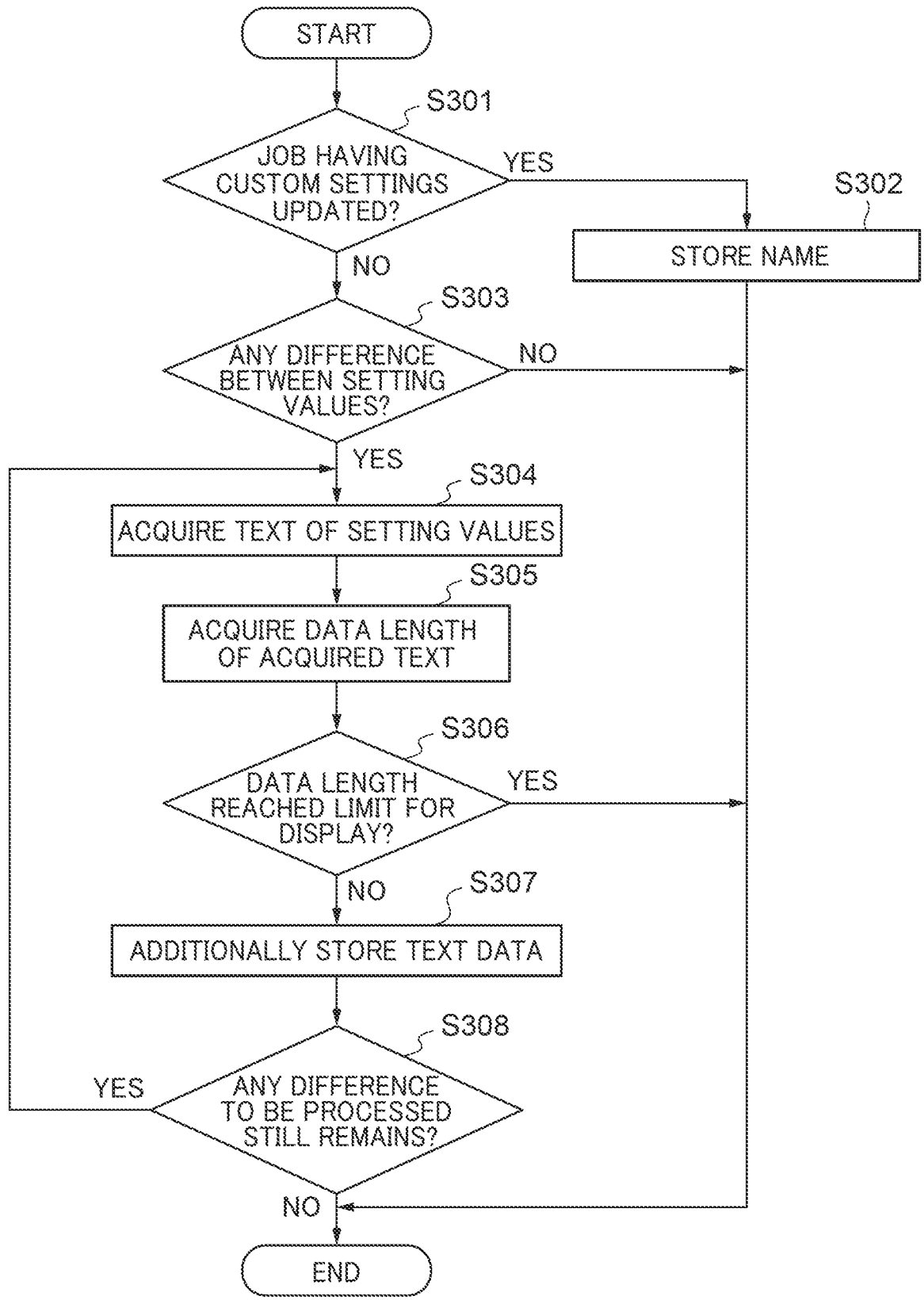
FIG. 9 is a flowchart of a process for registering display text in the integrated history data, which is executed in the process shown in FIG. 7.

FIG. 9 is a flowchart of a process for registering display text 85 of the integrated history data 80, which is executed in the process shown in FIG. 7. For example, the CPU 11 performs the process shown in FIG. 9 in the step S203 of FIG. 7 to thereby generate the display text 85 to be displayed on the history button 55. The CPU 11 may perform the process shown in FIG. 9 also when the selection screen 50 is displayed, for example. In a step S301, the CPU 11 determines whether or not the executed job is a job having custom settings therefor updated. In a case where the custom button has been selected on the selection screen, and further, any of the setting values has been changed on the configuration screen, the CPU 11 determines that the executed job is a job having the custom settings therefor updated. In this case, in a step S302, the CPU 11 generates text data including the date and time and the name of the selected custom button as the display text 85, followed by terminating the process shown in FIG. 9. If the executed job is not a job having the custom settings therefor updated, in a step S303, the CPU 11 determines whether or not there is a difference between all of the setting values of the configuration data for the last executed job and all of the default initial setting values of the initial configuration data. If there is no difference between them, the CPU 11 terminates the process shown in FIG. 9. If there is at least one difference between them, the CPU 11 acquires any setting value(s) of the last executed job which is/are different from the default initial value(s) corresponding thereto sequentially from the top of the configuration data one by one, and repeatedly executes the following steps described hereafter.

In a step S304, the CPU 11 acquires text of the current setting values different from the default setting values. By acquiring the text of the setting values different from their default setting values, it becomes easy to display text of the setting values intentionally set by the user and having left an impression on the mind of the user, on the history button 55. This makes it easier for the user to remember the combination of setting values associated with the history button 55. Next, in a step S305, the CPU 11 adds the data length of the text of the current setting values acquired in the step S304 to the data length of the display text already added to the history data 81 to thereby acquire the total data length at this time point. The length of a character string that can be displayed on the history button 55 has a predetermined limit. In a step S306, the CPU 11 checks whether or not the data length of the display text has reached the predetermined limit for display. If the data length of the display text has not reached the limit for display, the CPU 11 proceeds to a step S307 to additionally register the text data of the current setting values in the display text 85, and then proceeds to a step S308. If the data length of the display text has reached the limit, the CPU 11 discards the text data of the current setting values, followed by terminating the process shown in FIG. 9. In the step S308, the CPU 11 determines whether or not any difference between the setting values, which is to be processed, still remains. If there remains any difference to be processed, the CPU 11 returns to the step S304. If there remains no difference, the CPU 11 terminates the process shown in FIG. 9. With this, the text data indicative of the setting values different from the default setting values is registered in the history data 81 as the display text 85 within the predetermined limit for display of the character string on the history button 55. In the display text 85, the plurality of setting values are recorded in such a manner that it is possible to distinguish a setting value determined as a value which can be set and a setting value determined as a value which cannot be set. Note that in a case where the data length reaches the limit for display in a state in which there remains any unprocessed setting value, the CPU 11 may add the text of an indicator, such as ellipsis (" . . . "), to the end of the display text 85. This makes it possible to indicate that there remains at least a setting value other than the displayed setting values.

In the integrated history data 80 shown in FIG. 8, new history data 81 associated with a job executed by the image forming apparatus 1 using a combination of setting values including new setting values is registered by performing the processes in FIGS. 7 and 9. A plurality of items of the history data 81 are accumulated and recorded in the integrated history data 80. In each item of the history data 81 of the present embodiment, a plurality of setting values updated on the configuration screen when the job is executed, or the name of the custom job selected on the selection screen when the job is executed are/is registered together with the execution date and time, as the display text 85. Further, in a case where the same job as a job already registered is executed again, the file name 84 and the date and time of the display text 85 of the registered history data 81 are updated to new ones. Further, the CPU 11 sorts the plurality of items of the history data 81 recorded in the integrated history data 80 such that the latest one in date and time is located at the top. With this, the plurality of items of the history data 81 are displayed on the selection screen 50 in the descending order of the date and time. According to the above description, items of the history data 81 associated with all of the jobs executed by the image forming apparatus 1 are registered in the integrated history data 80. Each item of the history data 81 may be deleted from the integrated history data 80 by the CPU 11 according to a deletion operation. Further, each item of the history data 81 can be selected to be set as the settings of a custom button 53, or may be pinned such that it is preferentially displayed as a history button 55. Information on these operations is additionally registered in the history data 81, in other words, the setting of the custom button 53 and the setting of pinning are added to the history data 81, by the CPU 11. Note that the CPU 11 may change the order of items of the history data 81 such that history data 81 associated with one of the history buttons 55 which is pinned appears at the top of the integrated history data 80. Further, history data 81 registered in the integrated history data 80 is not limited to that of a job executed by the image forming apparatus 1 according to the present embodiment. The integrated history data 80 may include the history data 81 of a job executed by another device, which is received from the other device by the communication unit 12 of the image forming apparatus 1. The communication unit 12 of the image forming apparatus 1 may receive the history data 81 of a job directly from the other device, or indirectly via a data distribution server. In this case, the CPU 11 performs the processes in FIGS. 7 and 9 with respect to the received history data 81 of the other device, whereby it is possible to generate the history data 81 of a job which can be executed by the image forming apparatus 1, and register the generated history data 81 in the integrated history data 80.

Figure 10:
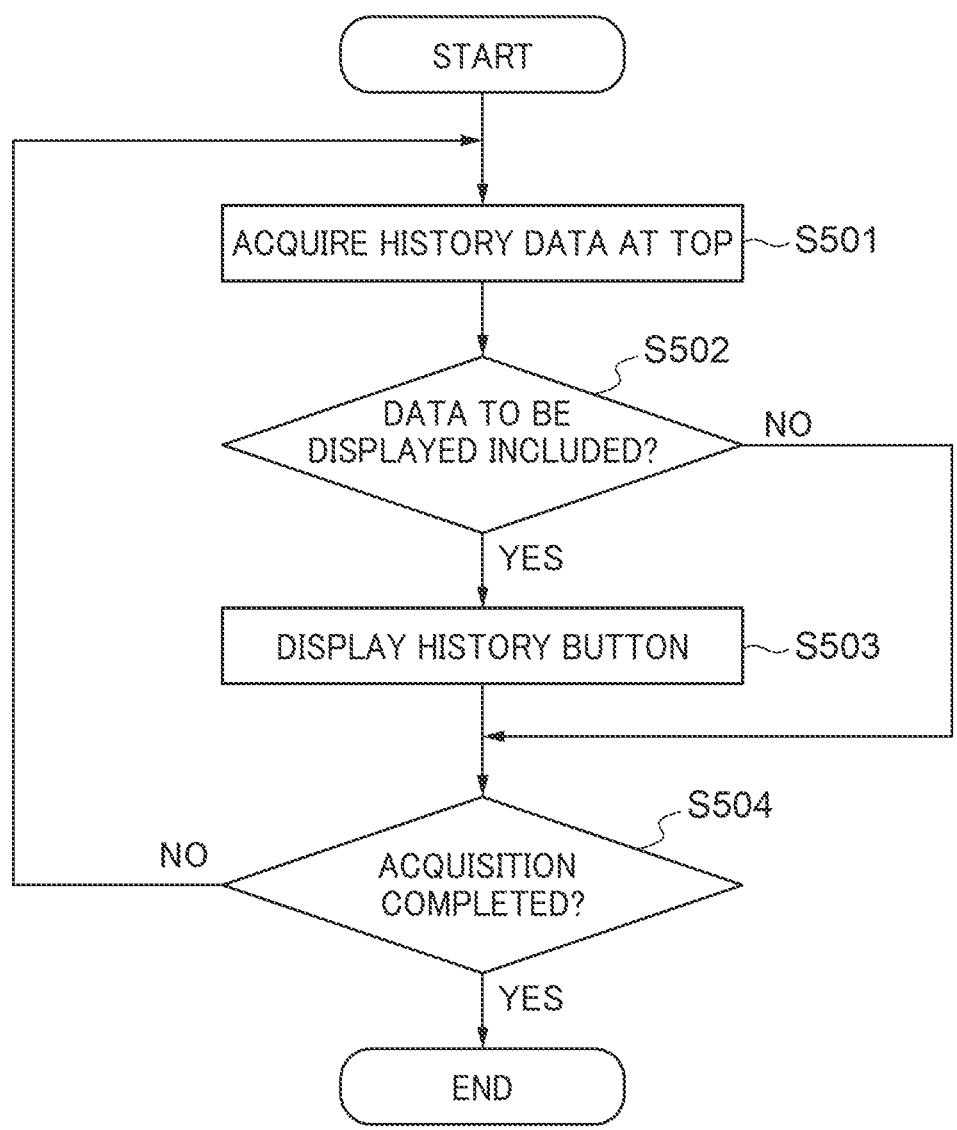
FIG. 10 is a flowchart of a process performed by the CPU so as to selectively display a list of a plurality of history buttons.

Next, a description will be given of a display process for selectively displaying a list of the plurality of history buttons 55 in the integrated history area 54 on the selection screen 50 shown in FIG. 3B. FIG. 10 is a flowchart of the process performed by the CPU 11 to selectively display a list of the plurality of history buttons 55. In a step S501, the CPU 11 acquires history data 81 at the top of the integrated history data 80. In a step S502, the CPU 11 determines whether or not the acquired history data 81 includes data to be displayed. If the history data 81 is neither that of a deleted job or is nor that of an executed job which was set for a custom button, the CPU 11 determines that the acquired history data 81 includes data to be displayed. If the acquired history data 81 does not include data to be displayed, the CPU 11 proceeds to a step S504.

If the acquired history data 81 includes data to be displayed, in a step S503, the CPU 11 assigns the display text 85 of the acquired history data 81 to the data to be displayed of the history button 55, and causes the data to be displayed on the history button 55 in the integrated history area 54 on the selection screen 50. In the step S504, the CPU 11 determines whether or not acquisition of the history data 81 from the integrated history data 80 is completed. If acquisition of the history data 81 is not completed, the CPU 11 returns to the step S501, and acquires the next history data 81 from the integrated history data 80. By repeating the above process with respect to all items of the history data 81 recorded in the integrated history data 80, the history buttons 55 associated respectively with registered items of the history data 81 are selectively displayed as a list in the integrated history area 54 on the selection screen 50. Note that the size of the display screen of the touch panel device 33 is limited. Therefore, the CPU 11 may terminate the process shown in FIG. 10 when the number of history buttons 55 reaches an upper limit number of buttons which can be displayed in the integrated history area 54. With this, as illustrated in the selection screen 50 shown in FIG. 3B, the plurality of history buttons 55 are selectively displayed in the integrated history area 54. Further, on each history button 55, there are displayed not only execution date and time, but also a combination of a plurality of setting values updated on the configuration screen 60 when an associated job is executed, or the name of a custom job selected on the selection screen 50 when the custom job is executed. Further, as illustrated in the selection screen 50 in FIG. 3B, the CPU 11 may display each image icon assigned to an associated one of the application buttons 52 or custom buttons 53, which was selected on the selection screen 50 when a job was executed, on the history button 55 associated therewith.

Figure 11:
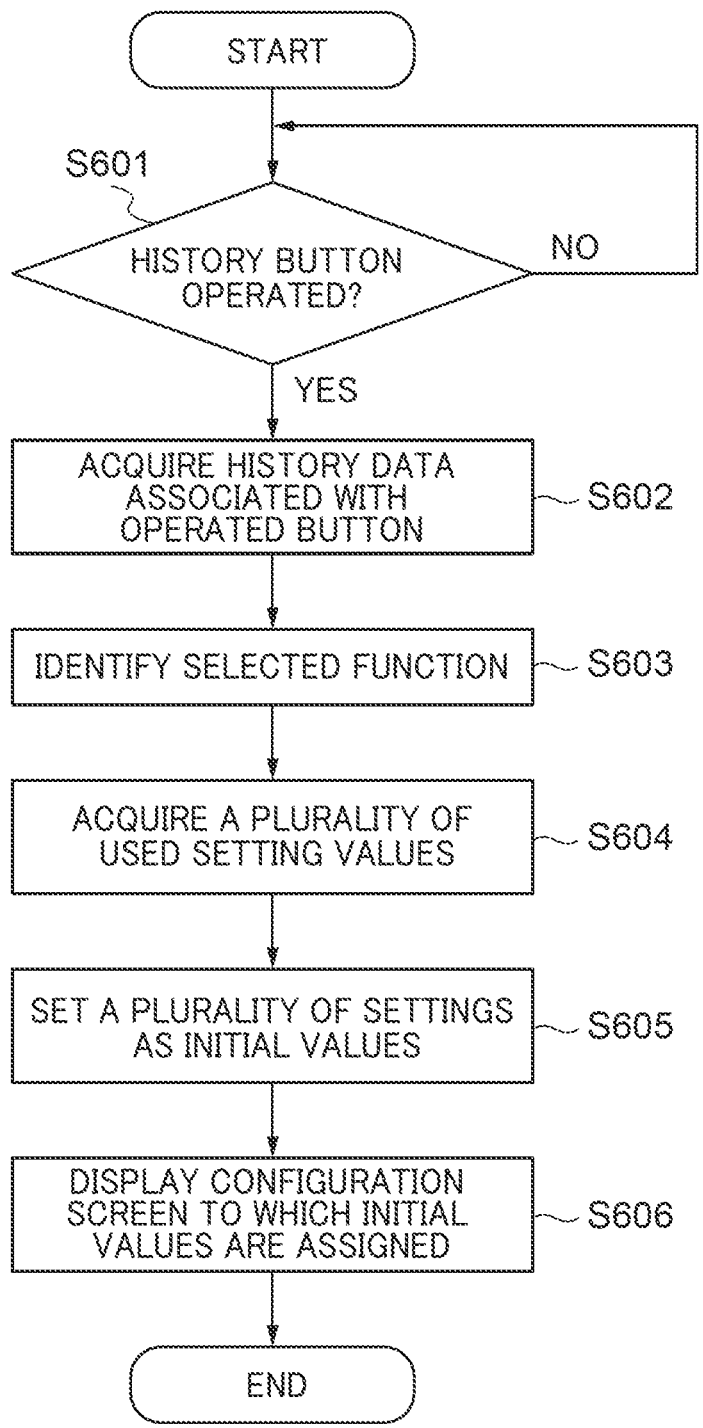
FIG. 11 is a flowchart of a process for displaying a configuration screen in a case where a history button is selected.

Then, when one of the history buttons 55 is operated on the selection screen 50, the CPU 11 executes a process for displaying the configuration screen 60 of a function associated with the operated button. FIG. 11 is a flowchart of the process for displaying the configuration screen 60 in a case where a history button 55 is selected. In a step S601, the CPU 11 determines whether or not the user has operated any of the history buttons 55. If the user has operated any of the history buttons 55, the CPU 11 proceeds to a step S602 to acquire the history data 81 associated with the operated history button 55 from the integrated history data 80. In a step S603, the CPU 11 identifies the selected function (application) using the acquired history data 81. In a step S604, the CPU 11 acquires a combination of a plurality of setting values, used in the past, from a file having the file name 84 included in the acquired history data 81. In a step S605, the CPU 11 sets the acquired plurality of setting values as the initial values of the selected function (application). In a step S606, the CPU 11 assigns the initial values to respective display items of the configuration screen 60 of the selected function, and displays the resultant configuration screen 60 on the touch panel device 33. As a result, the configuration screen 60 is displayed on the touch panel device 33 in place of the selection screen 50. The same setting values as those of the executed job are set as the initial setting values on the configuration screen 60.

In the series of display processing described above, first, the selection screen 50 as shown in FIG. 3B is displayed on the touch panel device 33. When displaying the selection screen 50, the CPU 11 extracts the history data 81 to which the setting of the custom button 53 is added, out of the plurality of items of the history data 81 of the integrated history data 80. Then, the CPU 11 displays the custom buttons 53 each displaying the extracted display text on the touch panel device 33. Further, the CPU 11 extracts the history data 81 to which the setting of pinning is added, out of the plurality of items of the history data 81 of the integrated history data 80. Then, the CPU 11 displays the history buttons 55 each displaying display text thereof. Further, the CPU 11 sequentially extracts, from the top of the plurality of items of the history data 81 of the integrated history data 80, the history data 81 to which neither the setting of the custom button 53 nor the setting of pinning is added. Then, the CPU 11 displays the history buttons 55 each displaying extracted display text thereof. Further, the CPU 11 may display the plurality of history buttons 55, with respect to the history data 81 selected on a user-by-user basis, on this selection screen 50. The plurality of history buttons 55 are displayed on one selection screen 50 displaying the application buttons 52 and the custom buttons 53 in an separate area from the areas for these buttons for distinction of the list of the history buttons 55. In the integrated history area 54, executed jobs are displayed of which the setting values were changed from the initial setting values on the configuration screen 60. In the integrated history area 54, for a plurality of executed jobs each having a redundant or same combination of setting values, history buttons 55 displaying the date and time of the last executed one of the jobs are displayed, to thereby each collectively display the executed jobs as one executed job. For the plurality of executed jobs each having the redundant or same combination of setting values, one history button 55 is displayed for a range based on selection of the application button 52, and one history button 55 is displayed for a range based on selection of the custom button 53.

Further, the plurality of history buttons 55 are displayed in list form in the integrated history area 54 such that executed jobs which were executed by selecting the respective associated application buttons 52 are discernible from executed jobs which were executed by selecting the respective associated custom buttons 53. For example, a combination of setting values, which were changed on the configuration screen 60 before execution of the job, are displayed on the history button 55 of the executed job executed by selecting the application button 52. On the other hand, a name registered for an associated custom job is displayed on the history button 55 of an executed job executed by selecting the custom button 53 associated with the custom job. In addition to these, each history button 55 has an icon image of the application job or an icon image of the custom job displayed thereon, based on selection on the selection screen 50 before executing the executed job.

Then, the different setting values from the default values or the name of the custom job is displayed as text on each history button 55, whereby the user can easily grasp the settings of each history button 55. Further, out of the plurality of history buttons 55, a history button 55 associated with the history data 81 which is set for preferential display by pinning is displayed at the uppermost location. The plurality of history buttons 55 are displayed in the order of preference. Further, as the plurality of history buttons 55, there is not displayed any button associated with the deleted history data 81 or with the history data 81 selected as that for the custom button 53 as the other display element. This makes it possible to prevent redundant display of buttons.

When the user operates any of the custom buttons 53 or the history buttons 55 being displayed, the CPU 11 acquires the file name 84 from the history data 81 including the button ID 82 of the operated button, and acquires the data of the plurality of setting values from the file having the acquired file name 84. Further, the CPU 11 acquires the application ID 83 from the history data 81 including the button ID 82 of the operated button, and identifies the selected function. Then, the CPU 11 displays the configuration screen 60 of the selected function, as in the case of the configuration screen 60 of the copy function, shown in FIG. 5, with the acquired setting values in a highlighted state. With a one-button operation of the history button 55, it is possible to reproduce the combination of setting values of a job which was executed in the past. On the configuration screen 60, setting values which can be originally set for the current setting values and setting values which can be set for the current setting values through change are displayed, as the initial values. Setting values which cannot be set as current setting values and cannot be changed are not displayed as the initial values. Further, when the start key 36 is operated, the CPU 11 sets the plurality of setting values assigned to respective associated buttons and displayed on the configuration screen 60 at the time, for the job, and executes the job. With this, the setting values in the past which can be directly executed and the setting values which can be executed by changing them are set for the job. The setting values in the past which cannot be changed for current execution are prevented from being used for the current job.

As described above, in the present embodiment, on the selection screen 50 for selecting a job of the image processing function, the history buttons 55 of executed jobs for which the history data 51 has been accumulated are selectively displayed, together with the application buttons 52 and the custom buttons 53. This enables the user to select the history button 55 of an executed job on the selection screen 50 to thereby set the setting values used in the past when the job was executed, as the initial setting values. Thus, the user can easily make settings for a job by reusing the setting of the job executed in the past.

What is more, the history buttons 55 of the executed jobs are displayed such that one associated with a job executed by selecting the associated application button 52 and one associated with a job executed by selecting the associated custom button 53 are discernible from each other. For example, on the history button 55 of an executed job executed by selection of the application button 52, there are displayed a combination of setting values which were changed on the configuration screen 60 before execution of the job. On the other hand, on the history button 55 of an executed job executed by selection of the custom button 53, there is displayed a name registered for the associated custom job. Further, each history button 55 of an executed job has an icon image of the application button 52 associated therewith or an icon image of the custom button 53 associated therewith displayed thereon. Therefore, the user can discern between the executed job associated with the application job and the executed job associated with the custom job, from the display of the history buttons 55, and easily remember the executed job and its setting values which are associated with each history button 55. In the present embodiment, it is possible to improve the convenience of reuse of the executed job. Further, the plurality of executed jobs each having the redundant or same combination of setting values are collectively displayed in one history button 55 displaying the date and time of the last executed job. With this display control, the user can more easily remember the settings of an executed job in the past which is associated with the history button 55.

In the present embodiment, the executed jobs of which the history data 81 is accumulated are displayed on the one selection screen 50 displaying the application buttons 52 and the custom buttons 53 in an arear separate from the areas for these buttons 52 and 53. Therefore, the user can easily remember the setting values of the executed job associated with each history button 55 based on the display thereof in list form enabling comparison therebetween. In the present embodiment, as the executed job displayed on the selection screen 50, executed jobs each having the setting values changed from the initial setting values on the selection screen 60 are selected. This makes it possible to prevent a job having the setting values which were not changed from the initial setting values, i.e. an executed job having the same setting values as the initial setting values of an application job or the initial setting values of a custom job from being displayed on the selection screen 50. In the present embodiment, for a plurality of executed jobs each having the redundant or same combination of setting values, one history button 55 is displayed on the selection screen 50, as a representative of those executed by selection of the application button 52. Further, one history button 55 is displayed on the selection screen 50 as a representative of those executed by selection of the associated custom button 53. Thus, in the present embodiment, even executed jobs each having the redundant or same combination of setting values are sorted into different ranges or groups, and displayed on a range-by-range basis, such that they can be distinguished according to user's operations including job selection before execution of each job. As a result, the history buttons 55 can be sorted into respective groups associated different user's selection operations, and can be given as respective different displays associated with different user's selection operations. The user can reuse the settings of an executed job by selecting the history button 55 on which is displayed text associated with setting values configured by operation of his/her own performed in the past.

Although in the present embodiment, the text (display information) displayed on each history button 55 is displayed by using the same attributes, with respect to both of text associated with an executed job executed by selection of the associated application button 52 and text associated with an executed job executed by selection of the associated custom button 53, this is not limitative. For example, text displayed on the history button 55 associated with an executed job executed by selection of the application button 52 and text displayed on the history button 55 associated with an executed job executed by selection of the custom button 53 may be displayed using different attributes. Examples of the attribute of the text include a character size and a character color. This makes it possible to further make these texts discernible from each other.

Figure 12:
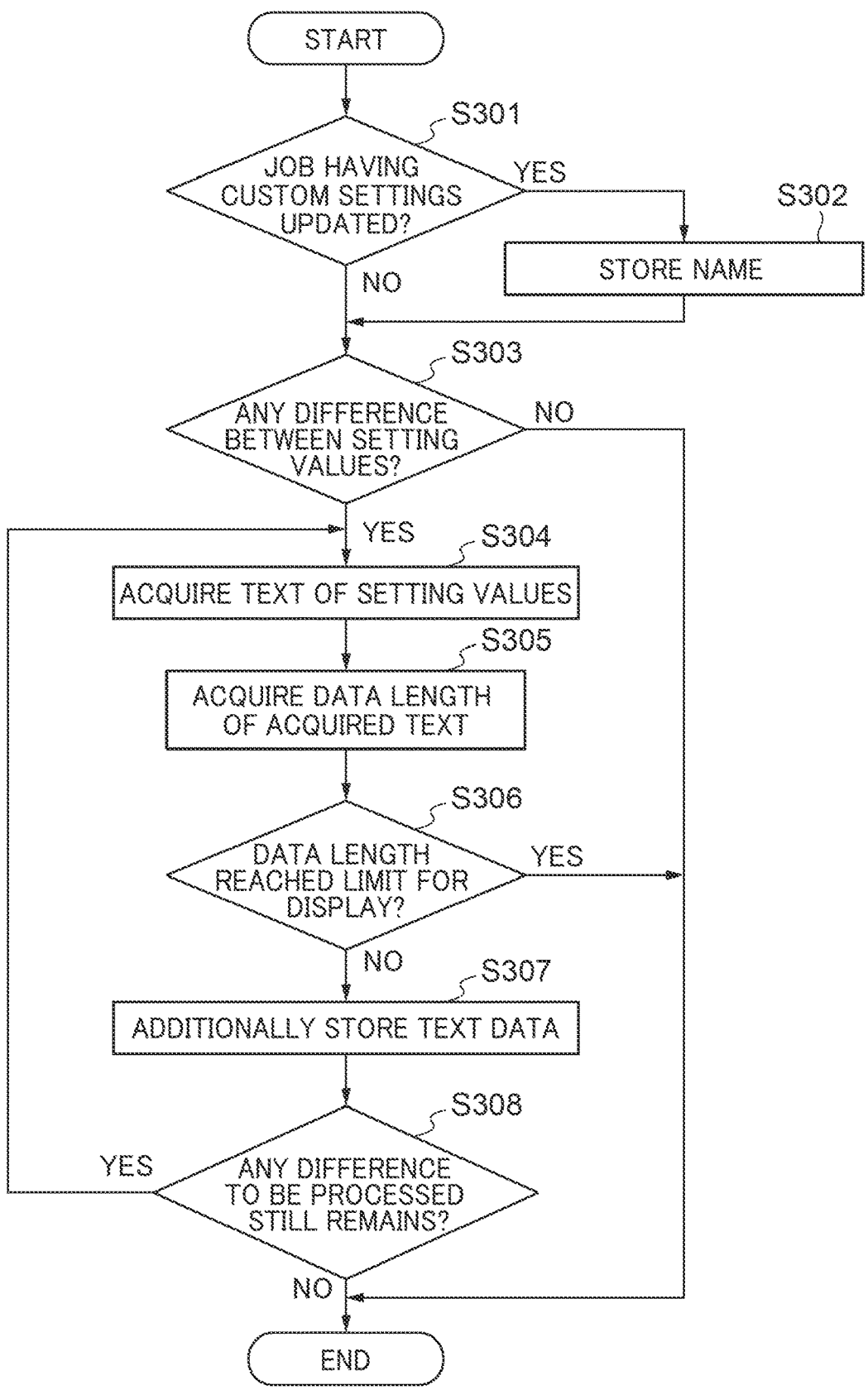
FIG. 12 is a flowchart of a process for registering display text in the integrated history data in a second embodiment of the present invention.

Next, a description will be given of the image forming apparatus 1 according to a second embodiment of the present invention. The following description is mainly given of different points from the image forming apparatus 1 according to the first embodiment. FIG. 12 is a flowchart of a process for registering display text in the integrated history data 80 in the second embodiment. Since the processing itself in each step is the same as described in FIG. 9, each step is referred to as such, i.e. with the definite article placed in front of it. In the step S302, CPU 11 adds text data having the name of the selected custom button to the display text 85 of the history data 81, and then proceeds to the step S303. In the step S303, the CPU 11 determines whether or not there is a difference between all of the setting values of the configuration data for the executed job executed last time and all of the default initial values of the initial configuration data. If there is no difference between all of the setting values and all of the default initial values, the CPU 11 terminates the process shown in FIG. 12. If there is a difference between one or more pairs of the setting values corresponding to each other, the CPU 11 acquires a setting value which is different from the default initial value by executing the steps S304 to S308, and registers the acquired setting value in the display text 85 of the history data 81.

Figure 14:
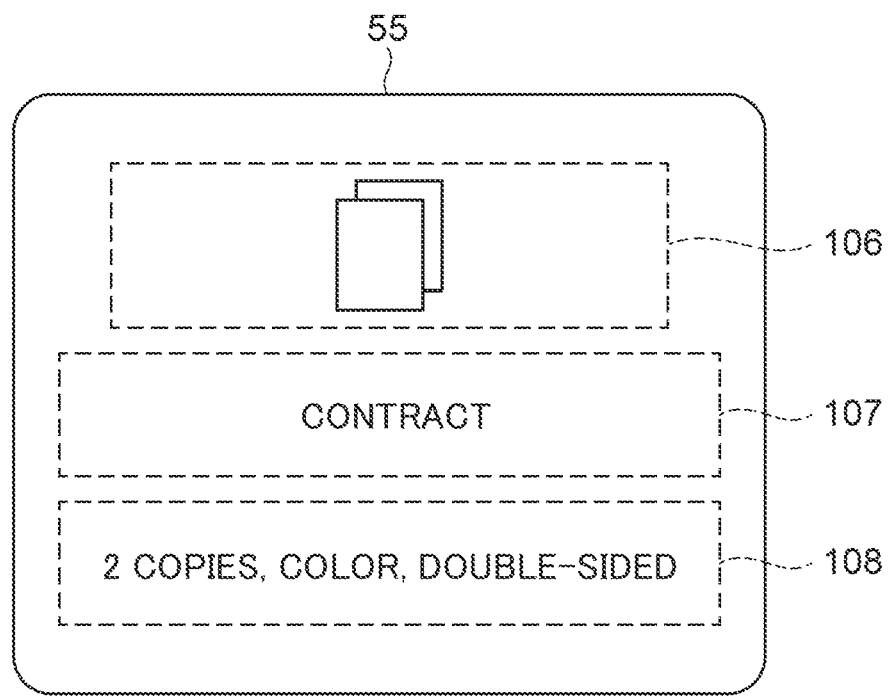
FIG. 14 is an explanatory view showing an example of the history button displayed based on the history data appearing in FIG. 13.

FIG. 13 is a diagram showing an example of the integrated history data 80, in which each executed job is registered as the history data 81 by performing the process shown in FIG. 12. Referring to FIG. 13, in the history data 81 in a first row of a data area of the integrated history data 80, a combination of a plurality of setting values updated on the configuration screen 60 of the executed job are registered together with the date and time and the name of the custom button 53 of the executed job, as the display text 85. In the history data 81 in a third row of the data area, a combination of a plurality of updated setting values are also registered together with the date and time and the name of the custom button 53. In this case, the CPU 11 displays a combination of updated setting values on each of the history buttons 55 of these executed jobs, together with the name of the custom button 53. FIG. 14 is an explanatory view showing an example of the history button 55 displayed based on the history data appearing in FIG. 13. FIG. 14 shows the history button 55 associated with the history data 81 on the first row in FIG. 13. On the history button 55 shown in FIG. 14, there are displayed an icon image 106 of the custom button 53, a name 107 of the custom button 53, and setting values 108 changed from the initial values of the custom job. By displaying the setting values 108 changed from the initial values of the custom job together with the name 107 of the custom button 53 as above, the user can easily remember the executed job associated with the history button 55.

Figure 15:
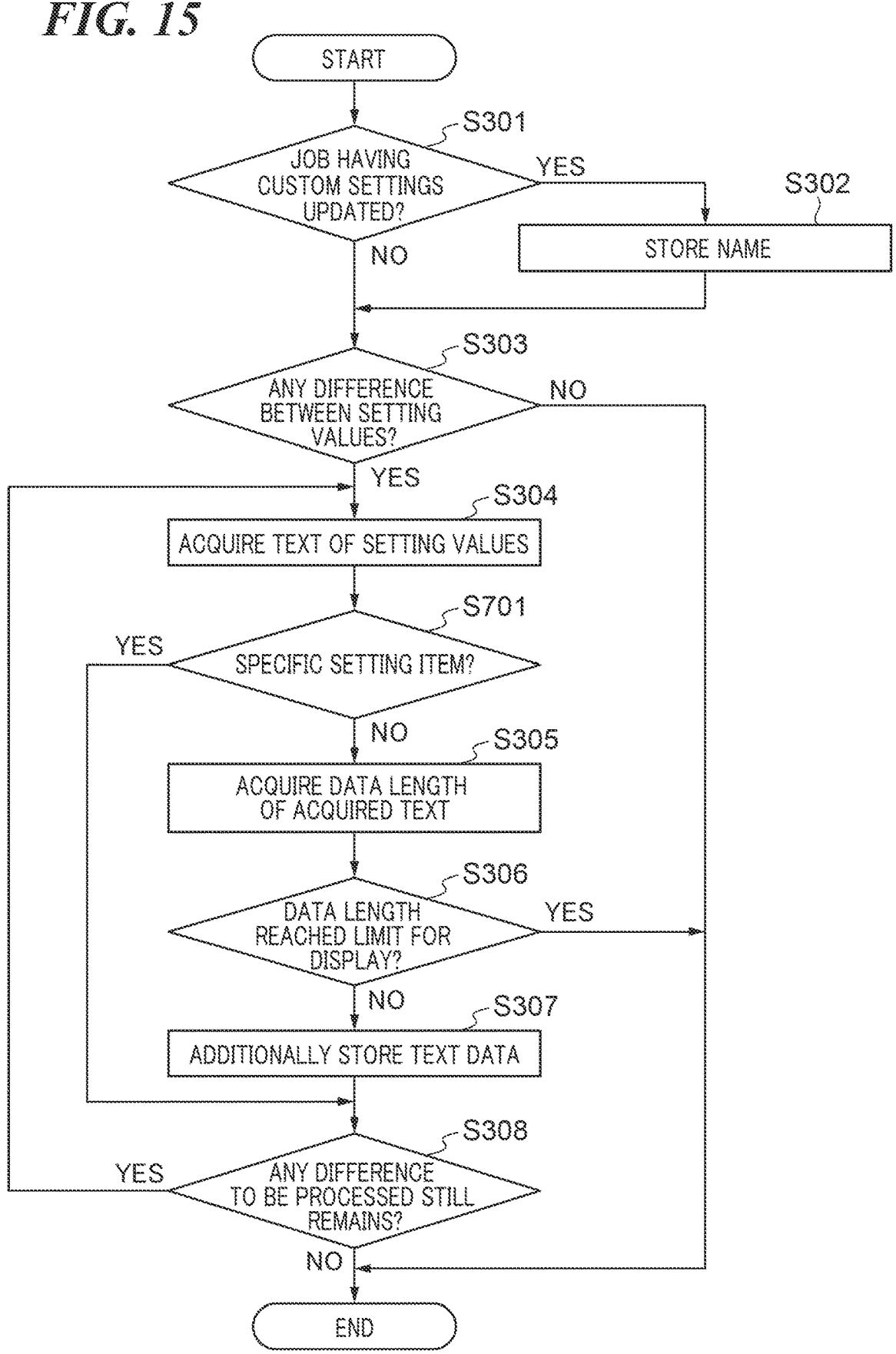
FIG. 15 is a flowchart of a process for registering display text in the integrated history data in a third embodiment of the present invention.

Next, a description will be given of the image forming apparatus 1 according to a third embodiment of the present invention. The following description is mainly given of a different point from the image forming apparatus 1 according to the second embodiment. FIG. 15 is a flowchart of a process for registering display text in the integrated history data 80 in the third embodiment of the present invention. The same steps as those described with reference to FIG. 9 are denoted by the same step numbers and description thereof is omitted. After acquiring text of setting values which are different from the default values in the step S304 in FIG. 15, the CPU 11 then determines in a step S701 whether or not an acquired setting value is that of any of specific setting items. In the present embodiment, the specific setting items refers to setting items which are not to be displayed on the button. If the acquired setting value is that of a specific setting item, the CPU 11 proceeds to the step S308 without adding the acquired setting value to the display text. On the other hand, if the acquired setting is not that of a specific setting item, the CPU 11 proceeds to the step S305, and performs processing for adding the acquired setting value to the display text.

Figure 17:
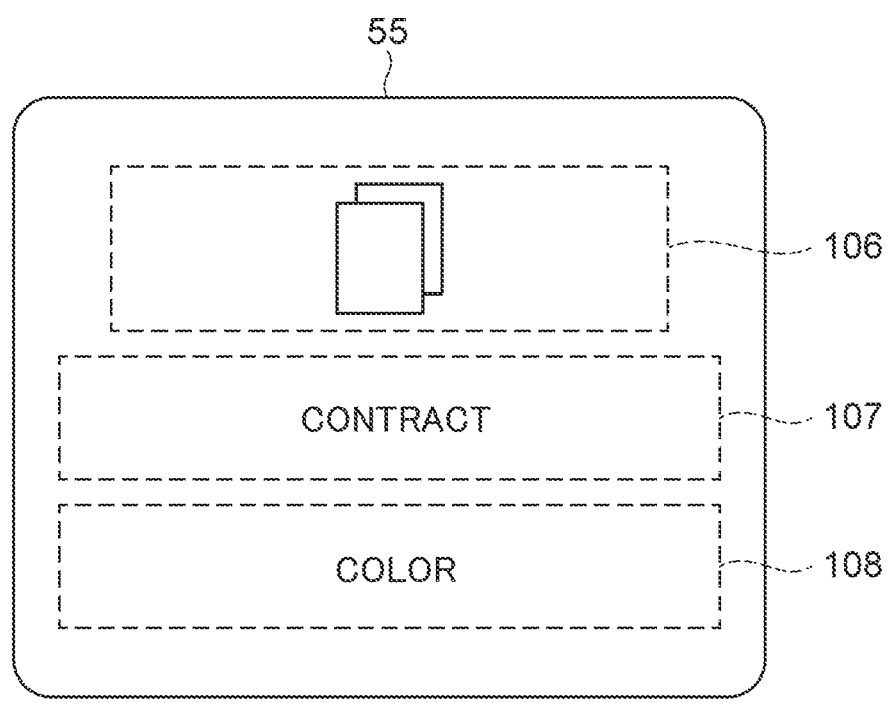
FIG. 17 is an explanatory view showing an example of the history button displayed based on the history data appearing in FIG. 16.

FIG. 16 is a diagram showing an example of the integrated history data 80, in which the each executed job is registered as the history data 81 by performing the process shown in FIG. 15. Referring to FIG. 16, in the history data 81 in a first row of a data area of the integrated history data 80, a setting value "color" of an item of color, which is not a specific setting item, is registered together with the date and time and the name of the custom button 53, as the display text 85. Similarly, in the history data 81 in a third row of the data area, a setting "automatic (color/gray)" of the item of color, which is not a specific setting item, is registered together with the date and time and the name of the custom button 53, as the display text 85. In this case, the CPU 11 displays the setting value which is not a specific setting item, together with the name of the custom button 53 on each of the history buttons 55 of these executed jobs. FIG. 17 is an explanatory view showing an example of the history button 55 displayed based on the history data appearing in FIG. 16. FIG. 17 shows the history button 55 associated with the history data 81 in the first row in FIG. 16. On the history button 55 shown in FIG. 17, there are displayed the icon image 106 of the custom button 53, the name 107 of the custom button 53, and the setting value 108 which is not that of a specific setting item. By displaying the setting value 108 changed from the initial setting value of the custom job together with the name 107 of the custom button 53 as above, the user can easily remember the executed job associated with the history button 55. Further, by preventing such a setting value of a setting item as frequently updated from being displayed, it is possible to display a setting value of a characteristic setting item of an executed job. Note that although in the present embodiment, each specific setting item is set as a setting item which is not to be displayed on the button, the specific setting item may be set as a setting item which is to be displayed on the button.

Next, a description will be given of the image forming apparatus 1 according to a fourth embodiment of the present invention. In the present embodiment, processing is described which is performed in a case where the custom button 53 is changed by addition, update, deletion processing or the like. The following description is mainly given of different points from the image forming apparatus 1 according to the first embodiment. FIGS. 18A and 18B are explanatory diagrams each showing an example of configuration data 110 of custom jobs which can be set by a user in the fourth embodiment. The configuration data 110 of custom jobs is stored e.g. in the HDD 15. FIG. 18A shows the configuration data 110 of custom jobs before the change. FIG. 18B shows the configuration data 110 of custom jobs after the change. The CPU 11 adds, updates, or deletes a custom job based on a user's configuration operation. In FIGS. 18A and 18B, the configuration data of a custom job having a custom ID of "0504" has the name of the custom button 53 changed from "contract" to "contract for storage". Further, the setting values are changed from "two copies, color, double-sided print" to "three copies, color, double-sided print". A configuration file name of a file storing the setting values is changed from "cstm01. xml" to "cstm03. xml".

Figure 19:
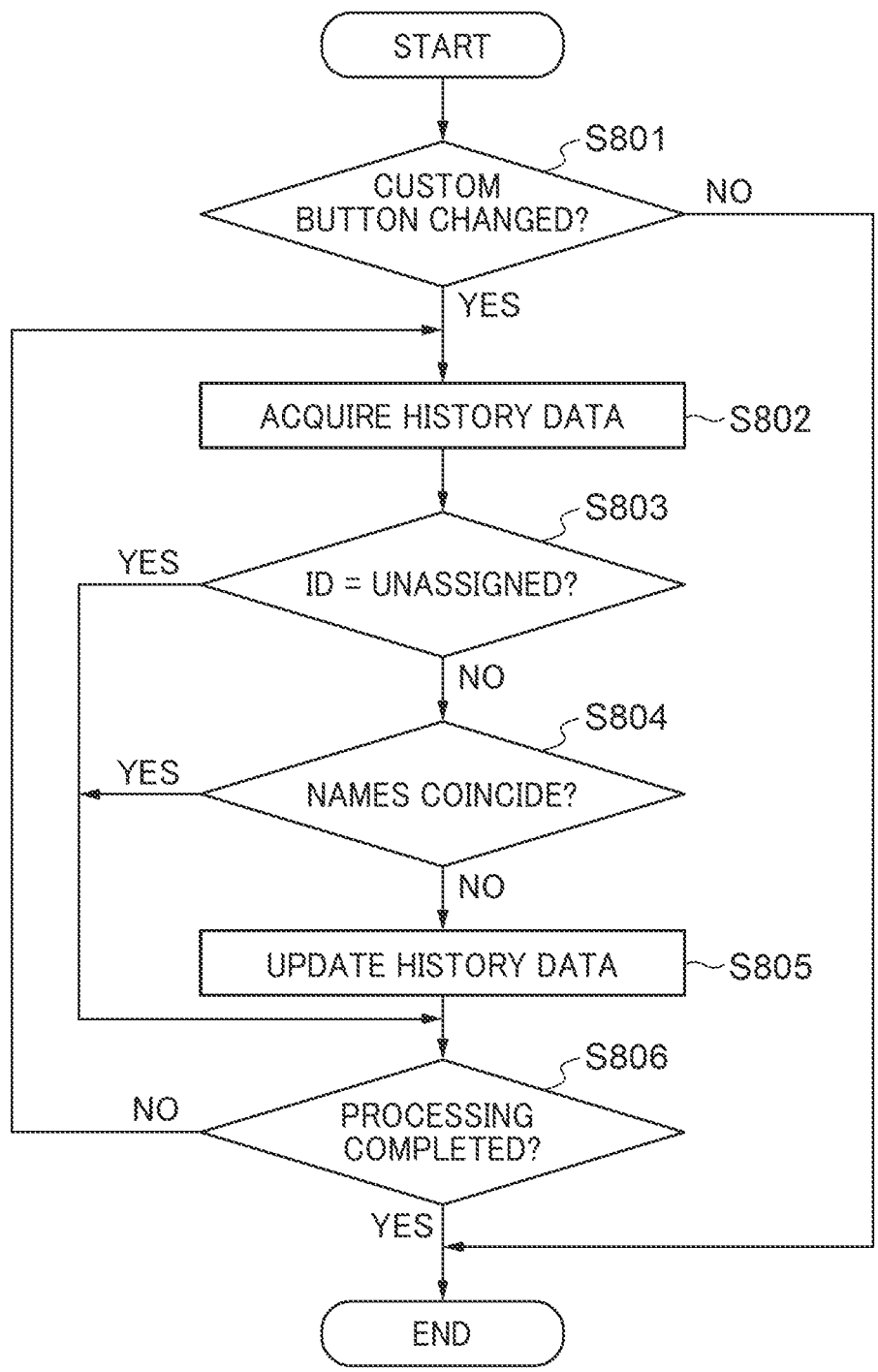
FIG. 19 is a flowchart of a process for updating the history data based on update of a custom job.

FIG. 19 is a flowchart of a process for updating the history data based on update of a custom job. In a step S801, the CPU 11 determines whether or not any custom button 53 has been changed. If no custom button 53 has not been changed, the CPU 11 terminates the process shown in FIG. 19. If any custom button 53 has been changed, in a step S802, the CPU 11 acquires history data 81' of integrated history data 80', described hereinafter with reference to FIG. 20. Then, in a step S803, the CPU 11 determines whether or not a custom ID is unassigned in the acquired history data 81'. If no custom ID is assigned in the acquired history data 81', the CPU 11 proceeds to a step S806. If the custom ID is not unassigned, i.e. has been assigned in the acquired history data 81', the CPU 11 proceeds to a step S804 to determine whether or not the name registered in the display text 85 of the history data 81' and the name of the custom job having the custom ID in the configuration data 110 coincide with each other. If the names coincide with each other, the CPU 11 proceeds to the step S806. If the names do not coincide with each other, the CPU 11 proceeds to a step S805 to update the acquired history data 81'. With this, the history data 81' is updated to a state corresponding to the changed custom button 53. After that, in the step S806, the CPU 11 determines whether or not processing is completed with respect to all items of the history data 81'. If processing is not completed, the CPU 11 returns to the step S802, and acquires the next history data 81'. If the processing is completed, the CPU 11 terminates the process shown in FIG. 19.

FIG. 20 is a diagram showing an example of the integrated history data 80' updated by performing the process shown in FIG. 19. The history data 81' appearing in FIG. 20 has the custom ID, denoted by reference numeral 86, of the custom job selected before execution of the executed job. The CPU 11 determines as to the history data 81' in the first row that the name of the display text 85 thereof does not coincide with the name of the custom job in the first row of the configuration data 110 in FIG. 18B, based on the registered custom ID 86 of "0504", and updates the name of the display text 85 from "contract" to "contract for storage". The CPU 11 does not update the display text 85 with respect to the history data 81' in the second row because the custom ID 86 is unassigned. The CPU 11 determines as to the history data 81' in the third row that the name of the display text 85 thereof coincides with the name of the custom job in the third row in FIG. 18B, based on the registered custom ID 86 of "0506", and does not update the display text 85.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-018374 filed Feb. 5, 2018, which is hereby incorporated by reference herein in its entirety.

What is claimed is:

1. An image forming apparatus comprising:
a display configured to display an application button permitting a user to select one function from among a plurality of functions including at least a print function, a custom button for calling setting values set by the user, and a configuration screen on which the setting values corresponding to the custom button are reflected as a result of the custom button being selected;
a storage configured to record, when a job is executed based on the setting values on the configuration screen, the setting values for the executed job; and
a processor configured to execute instructions stored in a memory to function as a display control unit configured to display a history button for calling the setting values recorded by the storage,
wherein a name of the custom button and at least part of the setting values are displayed on the history button,
wherein, after the setting values corresponding to the custom button are changed on the configuration screen and the job is executed based on the changed setting values, a history button for calling the changed setting values is generated, and
wherein the name of the custom button and at least part of the changed setting values are displayed on the generated history button.

2. The image forming apparatus according to claim 1, wherein history buttons are displayed on one screen, on which the application button and the custom button are displayed, in list form separately from the application button and the custom button.

3. The image forming apparatus according to claim 1, wherein the display control unit displays, on a history button generated based on the executed job executed by selection of the application button, setting values changed on the configuration screen when executing the job.

4. The image forming apparatus according to claim 1, wherein the date and time of last execution of the job are displayed on the history button.

5. The image forming apparatus according to claim 1, wherein an image, which is the same as an image displayed on the application button or the custom button, is displayed on the history button in a way that can discern whether the history button was generated based on the selection of the application button or the history button was generated based on the selection of the custom button.

6. The image forming apparatus according to claim 1, wherein information of the executed job executed by selection of the application button and information of the executed job executed by selection of the custom button is displayed on the history buttons using attributes different from each other.

7. The image forming apparatus according to claim 1, wherein as the history button to be displayed on the one screen, the executed job having setting values changed from initial setting values corresponding to the application button or initial setting values corresponding to the custom button is selected.

8. The image forming apparatus according to claim 1, wherein, with respect to a plurality of history buttons corresponding to redundant setting values, one history button is displayed for a range based on selection of the application button, and one history button is displayed for a range based on selection of the custom button.

9. A method of controlling an image forming apparatus that displays an application button permitting a user to select one function from among a plurality of functions including at least a print function, a custom button for calling setting values set by the user, and a configuration screen on which the setting values corresponding to the custom button are reflected as a result of the custom button being selected on a display, the method comprising:

recording, when a job is executed based on the setting values on the configuration screen, the setting values for the executed job; and displaying a history button for calling the recorded setting values, wherein a name of the custom button and at least part of the setting values are displayed on the history button, wherein, after the setting values corresponding to the custom button are changed on the configuration screen and the job is executed based on the changed setting values, a history button for calling the changed setting values is generated, and wherein the name of the custom button and at least part of the changed setting values are displayed on the generated history button.

10. A non-transitory computer-readable storage medium storing a computer-executable program for executing a method of controlling an image forming apparatus that displays an application button permitting a user to select one function from among a plurality of functions including at least a print function, a custom button for calling setting values set by the user, and a configuration screen on which the setting values corresponding to the custom button are reflected as a result of the custom button being selected on a display, wherein the method comprises:

recording, when a job is executed based on the setting values on the configuration screen, the setting values for the executed job; and displaying a history button for calling the recorded setting values, wherein a name of the custom button and at least part of the setting values are displayed on the history button, wherein, after the setting values corresponding to the custom button are changed on the configuration screen and the job is executed based on the changed setting values, a history button for calling the changed setting values is generated, and wherein the name of the custom button and at least part of the changed setting values are displayed on the generated history button.

* * * * *